March 24, 1970 R. W. LUCKY 3,502,986
ADAPTIVE PREDICTION FOR REDUNDANCY REMOVAL
IN DATA TRANSMISSION SYSTEMS
Filed Dec. 14, 1967 2 Sheets-Sheet 1

INVENTOR
R. W. LUCKY
BY J. P. Kearns
ATTORNEY

March 24, 1970 R. W. LUCKY 3,502,986

ADAPTIVE PREDICTION FOR REDUNDANCY REMOVAL IN DATA TRANSMISSION SYSTEMS

Filed Dec. 14, 1967 2 Sheets-Sheet 2

United States Patent Office 3,502,986
Patented Mar. 24, 1970

3,502,986

ADAPTIVE PREDICTION FOR REDUNDANCY REMOVAL IN DATA TRANSMISSION SYSTEMS

Robert W. Lucky, Fair Haven, N.J., assignor to Bell Telephone Laboratories, Incorporated, Murray Hill, N.J., a corporation of New York Filed Dec. 14, 1967, Ser. No. 690,585
Int. Cl. H03k 13/22; H04b 1/66
U.S. Cl. 325—38 8 Claims

ABSTRACT OF THE DISCLOSURE

The transversal delay line filter is employed in a linear, time-variant signal predictor for redundancy removal in digital data transmission systems. Tap attenuators on the delay line are continuously and adaptively adjusted in response to the difference between actual signal samples and predicted signals derived from a finite number of past signal samples. Only the difference signals are transmitted to reduce line signal power. A similar adaptive transversal filter at the receiver reconstructs the original data by re-insertion of the predicted components into samples of the received difference signals.

Field of the invention

This invention relates to digital data transmission systems and specifically to the application of linear prediction to such systems.

Background of the invention

In a number of U.S. patents issued to B. M. Oliver: specifically No. 2,681,385 of June 15, 1954; No. 2,701,274 of Feb. 1, 1955; and No. 2,732,424 of Jan. 24, 1956; the theory of linear prediction was applied to the removal of redundancy in analog transmission systems. It was then realized that there exists a considerable degree of correlation in periodic samples of such analog signals as those for television and telemetry. Transmission channels for such signals were being designed on the assumption that the signals to be transmitted were completely random. However, the efficiency of channel capacity utilization can be greatly increased by periodically sampling the analog signal, predicting the succeeding value, comparing this predicted value with the actual value and transmitting only the difference. If this difference is further quantized in a pulse code modulation format, a much reduced number of transmission levels is necessitated. At the receiver the original signal is readily reconstructed from the received differences by an inverse prediction arrangement. Consequently, compression of the required signal bandwidth becomes feasible because fewer digits per sample suffice to encode the differences than the actual signals.

In Oliver's 2,732,424 patent a tapped delay line with adjustable tap attenuators is suggested as a practical linear predictor. Coefficients for these attenuators are established in an empirical way based on average signal statistics and are not disturbed once these statistics are ascertained or assumed. Thus, the prediction is time invariant. Time variant signal prediction systems are also recognized as theoretically possible, but have been realized in practice only by way of complex computer routines.

It is an object of this invention to apply the principles of linear prediction to the removal of redundancy in digital data transmission systems.

It is a further object of this invention to provide a simply instrumented, time-variant adaptive filter for use as a linear predictor in a digital data transmission system.

It is another object of this invention to increase transmission efficiency in digital data transmission systems by either reducing the required transmission power for a given error rate or reducing the error rate for a fixed transmission power level.

Summary of the invention

According to this invention, a linear prediction system for digital data comprises at the transmitter a tapped delay line with an incremental delay equal to the bit interval, an adjustable attenuator connected to each tap on the delay line, summing means for the attenuator outputs; differencing means subtracting the output of the summing means for the input digit to form a line signal, means correlating the output of the differencing means with the unattenuated output of each delay line tap, and means for setting the attenuator coefficients in accordance with the output of the correlating means; and at the receiver a matching tapped delay line, an adjustable attenuator connected to each tap on the matching delay line, first summing means for the attenuator outputs, second summing means adding to the received signal the output of the first summing means to reconstruct the original transmitted digit, means slicing the reconstructed digit to normalize it, means coupling the sliced reconstructed digit to the tapped delay line, means correlating the sliced reconstructed digit with the unattenuated output of each delay line tape, and means for setting the attenuator coefficients in accordance with the output of the correlating means.

Since the transversal filters at the transmitter and receiver are mirror images of each other, they both make the same prediction for the next transmitted bit. This prediction is essentially a least squares estimate based on a weighted summation of a finite number of previous digits stored in the delay lines. As long as there is any degree of correlation between successive digits within the span of the delay lines, the difference signal will have lesser variance than the input data. Consequently a linear modulator will generate less line power in transmitting difference samples than in transmitting the original data.

After demodulation at the receiver the predicted component is added to the received difference signals to reconstruct the original data. A slicing circuit is added to square up the output data and to remove noise contributed by the transmission channel.

A distinctive advantage of this invention is that the feedback of the difference signal and its correlation with the stored samples tends to optimize the tap attenuator settings without the complications of an auxiliary computer. The tap attenuator settings are rendered time variant in a very simple and straightforward manner.

A feature of this invention is that the delay line storage function can be assumed by a shift register.

Another feature is that the correlators and attenuators for binary data transmission can be realized by simple polarity switches.

Description of the drawing

The above and other objects, features and advantages of this invention can be more readily appreciated by a consideration of the following detailed description and the drawing in which.

Detailed description

Figure 1:
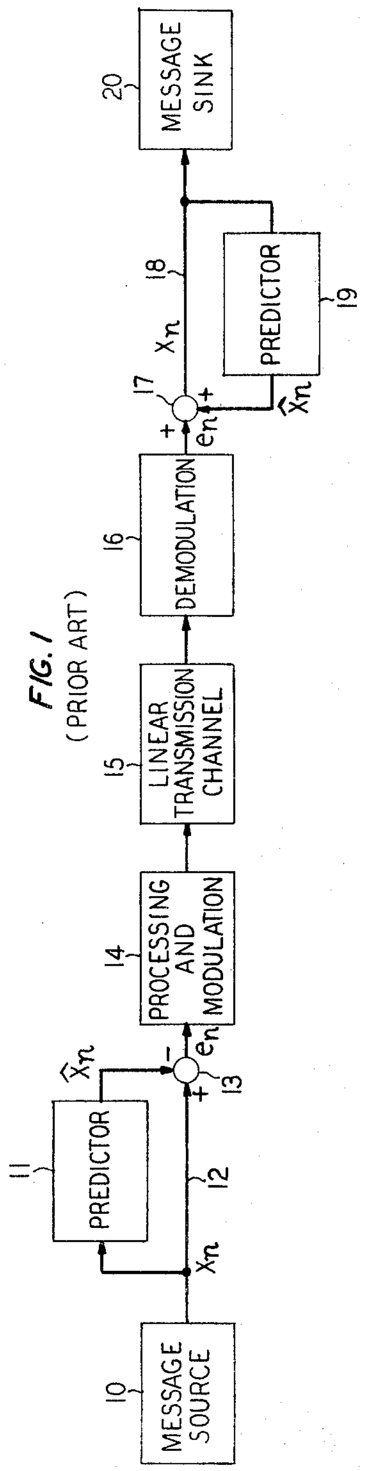
FIG. 1 (PRIOR ART)
FIG. 1 is a generalized block diagram of the signal prediction system of the prior art.

The basic idea of linear prediction as set forth in the cited Oliver patents and elsewhere is illustrated in the block diagram of FIG. 1. In this diagram input data samples originating in a message source 10 are assumed to be taken from a time series $x_n$. These samples are passed through a linear predictor filter 11 whose output $\hat{x}_n$ (the superposed carat or "hat" indicates an estimated value) at time $t_n$ forms a linear prediction of the present sample $x_n$ based on a weighted summation of all preceding samples which have been stored in the predictor filter. The prediction $\hat{x}_o$ is subtracted from the actual sample $x_n$ provided over line 12 in a differencing amplifier 13 shown symbolically by a circle. The difference is an error signal $e_n$, which alone is passed on for further processing and modulation in processor 14. Processing may include conventional operations such as pulse coding and frequency translation to match the transmission characteristics of a transmission channel indicated in block 15. Since the prediction portion $\hat{x}_n$ removed from the input sequence is a deterministic function of past input signals, no information has been lost. The original signal sequence can be reconstructed at the receiver by means of an inverse predictor feedback loop.

At the receiver the error sequence $e_n$ is restored to baseband in conventional demodulator 16 and applied to an adder 17 indicated by a circle. The output of adder 17 is the signal $x_n$ reconstructed by the addition to error signal $e_n$ of the separately computed predicted value $\hat{x}_n$ derived in predictor 19. Predictor 19 is the inverse of predictor 11 at the transmitter and has as its input the output of adder 17 supplied on lead 18. The signal $x_n$ on lead 18 is also supplied to message sink 20.

Predictive systems have been widely studied for application to bandwidth compression of telemetry and television data. In these cases error samples $e_n$ are typically quantized and transmitted by pulse code modulation techniques. Because of the redundancy, that is, predictability, in the source data, fewer digits per sample and hence less bandwidth are required for the transmission of the error samples than of the original samples for a given fidelity of reproduction.

The major difficulty with these data compression systems is the determination of the predictor filter. On this account predictive transmission systems have never emerged from the laboratory. The practical determination of the statistical properties of the input data and the realization of the optimum predictive filter have not been satisfactorily realized. Those systems which have been demonstrated have been based on average statistical descriptions and the resultant predictive filters have been time invariant. Approaches to time variant or adaptive predictors have been confined to computer-processed data.

Figures 2, 3:
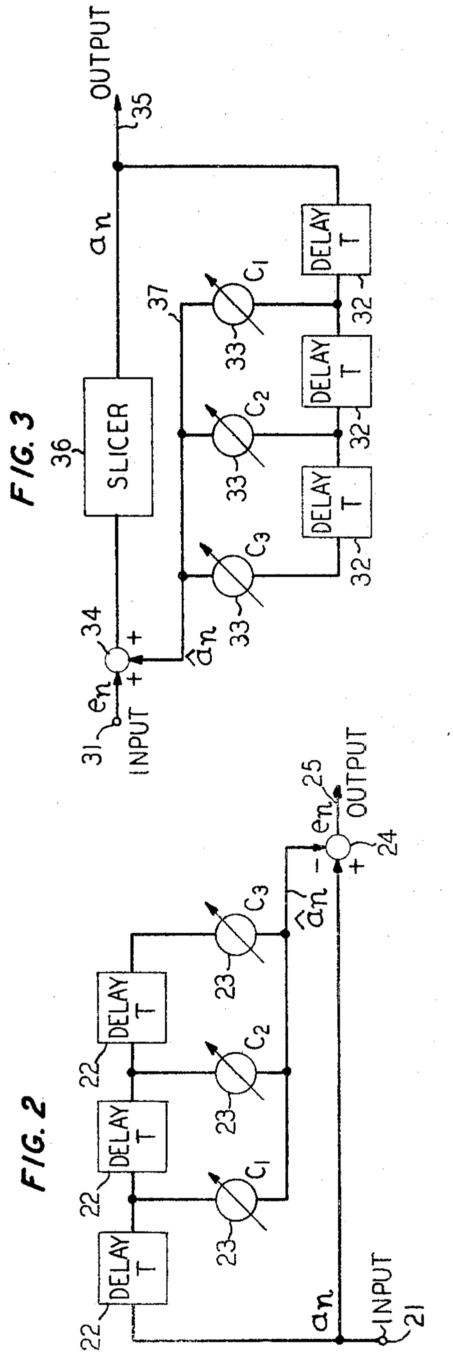
FIG. 2 is a block schematic diagram of the signal predictor used at the transmitting end of a data transmission system.
FIG. 3 is a block schematic diagram of a matching signal predictor at the receiving end of a data transmission system.

This invention covers a simply instrumented adaptave filter for use as a predictor. As shown in FIGS. 2 and 3 for the respective transmitting and receiving filters, finite tapped delay lines 22 and 32 have tap attenuators 23 and 33 whose coefficients $c_n$ are continually adjusted to provide a least squares prediction of incoming data. The coefficient settings are based on the statistics of a finite section of past data during a learning period. As the statistics change, the coefficients should be changed automatically to provide an updated version of the predictor filter.

FIGS. 2 and 3 show the general arrangement of predictive filters which are nonadaptive. At input 21 in FIG. 2 binary input digits $a_n$ are applied both to a subtractor 24 and a delay line 22, shown here as having three stages each with equal delays T, the reciprocal of the data transmission rate. Connected to each output of delay units 22 are adjustable attenuators 23 (the arrows indicate adjustability). Individual tap gains $c_k$ are to be established so that the filter output becomes the predicted value $$\hat{a}_n = \sum_{k=1}^{N} c_k a_{n-k}$$

where $c_k$ is the tap coefficient, $k$ is the tap index, N is the number of taps and $a_n$ is the present actual digit value (plus or minus one).

The present predicted value $\hat{a}_n$ is substracted from the present actual value $a_n$ in substractor 24 to obtain an error sample $e_n$, which is transmitted. Although $a_n$ takes on only the binary values $+1$ or $-1$, both $\hat{a}_n$ and $e_n$ are analog values. Whenever the digits $a_n$ are correlated, for example, have periodicity within the range of the chosen number of delay line taps N, error samples $e_n$ will, for correctly chosen tap gains $c_k$, have smaller variance than the unit variance of the input data. A linear modulator connected to the output 25 of substractor 24 will require less power in transmitting the error samples than in transmitting the original data.

After demodulation at the receiver the received error component $e_n$ on line 31 of FIG. 3 is added to a newly computed prediction $\hat{a}_n$ derived in a bootstrap prediction filter as shown. The bootstrap filter is the same as that at the transmitter and has a delay line 32 with units of delay T and tap attenuators 33 with coefficients $c_k$ identical to those at the transmitter. The combined outputs of attenuators 33 yield on lead 37 the same value $\hat{a}_n$ predicted at the transmitter in the absence of noise. This predicted value is added to the incoming error signal $e_n$ in adder 34. The receiver filter is embellished by a slicer or threshold trigger circuit 36 between the output of adder 34 and output terminals 35. The slicer normalizes the output and removes the effects of any line noise from the reconstructed value. The bootstrap arrangement at the receiver has some points of similarity with direct-current restoration systems.

Under time invariant conditions the settings of attenuators 23 and 33 would be established under a priori empirical conditions based on a study of the average statistics of the type of signal being predicted. According to this invention, the coefficients $c_k$ are established continuously and adaptively.

Figure 4:
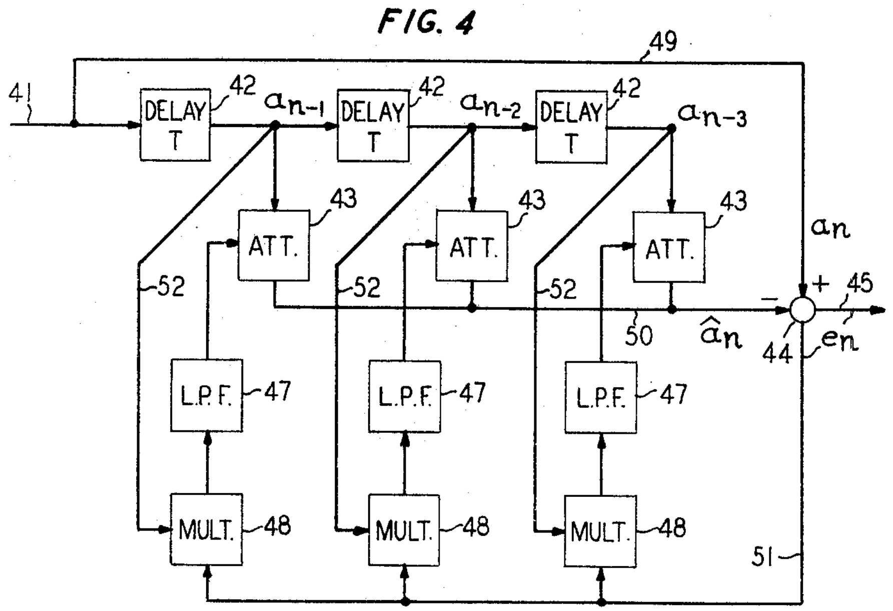
FIG. 4 is a block diagram of an adaptive signal predictor for use in a data transmitter according to this invention.

FIG. 4 is a block diagram of the transmitting adaptive predictor according to this invention. Digital signals incident on output lead 41 are delayed by incremental amounts T in delay units 42. Digital signals here encompass both binary and multilevel symbols synchronously transmitted. Delay T is the reciprocal of the data symbol transmission rate as before so that the outputs of the respective delay units are previous digital values $a_{n-1}$, $a_{n-2}$, $a_{n-3}$ as indicated. The outputs of each delay unit are selectively attenuated by attenuators 43 with adjustable coefficients and summed on lead 50 to form a predicted value $\hat{a}_n$. The error difference between the present actual digit value $a_n$ on lead 49 and the present predicted value $\hat{a}_n$ is taken in subtractor 44 as before. This error value $e_n$ is transmitted on lead 45 and also applied to bus 51. Error value $e_n$ on bus 51 is correlated in multipliers 48 with the delayed prior input digits from the outputs of delay units 42 on leads 52. Where the digits on leads 52 are binary, both attenuators 43 and multipliers 48 may be simple inverting switches. The error values $e_n$ are analog, however, and therefore the outputs of multipliers 48 are also analog. These correlated values from multiplier 48 are integrated and averaged in low-pass filters 47 to form control signals for attenuators 43. The time constants for filters 47 will in general be several times the reciprocal of the transmission rate to prevent erratic operation.

Where other than binary data are transmited, attenuators 43 may be either of the incrementally adjustable type disclosed in F. K. Becker et al. Patent No. 3,292,110, issued Dec. 13, 1966 or the continously adjustable type disclosed in the copending application of E. Port, Ser. No. 663,148, filed Aug. 24, 1967. The incrementally adjustabe attenuators employ relay-controlled resistive ladder networks and the continually adjustable type employs field-effect transistors.

The effect of the feedback loop including the correlators is to attempt continuously to reduce the error signal $e_n$ to zero. For a three-tap predictor as shown in FIG. 4 all-one, all-zero or dotting input patterns represent perfect correlation and the error output rapidly settles to zero, at a rate dependent on the characteristics of the smoothing low-pass filters 47. However, it may be undesirable to reduce the error output to zero and generate synchronization problems at the system receiver. On this account it may be advantageous to include in each predictor a nonlinear element such as a limiter to keep the predictions smaller than unity in magnitude. As long as the same nonlinearity is used in both transmitter and receiver predictors, the data signal will be reconstructed perfectly at the receiver.

Figure 5:
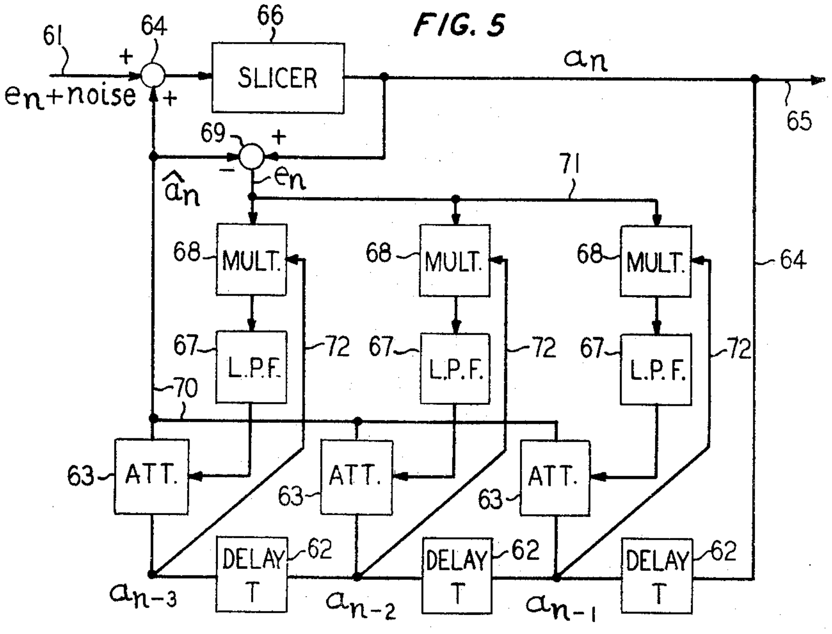
FIG. 5 is a block diagram of an adaptive signal predictor for use in a data receiver according to this invention.

FIG. 5 is a block diagram of the receiving adaptive predictor according to this invention. This predictor is the inverse of that shown in FIG. 4 with the addition of a slicing circuit. The transmitted error signal $e_n$ appearing at input 61 to which noise from the transmission channel has been added, is combined in adder 64 with the predicted signal $\hat{a}_n$ appearing on lead 70 to reconstruct the digit $a_n$. Slicer circuit 66 at the output of adder 64 standardizes the reconstructed digit which appears on output terminal 65 and lead 64 and for reasonable signal-to-noise ratios (of the order of ten decibels or better) rejects noise added by the channel. The recovered digit is delayed by unit amounts T in delay units 62 in whose outputs appear $a_{n-1}$, $a_{n-2}$ and $a_{n-3}$, respectively. These prior digits are applied to the inputs of attenuators 63 and multipliers 72 as shown. The summed outputs of attenuators 63 appearing on bus 70 constitute the predicted present digit $\hat{a}_n$. The digital output $a_n$ of slicer 66 has subtracted from it predicted digit $\hat{a}_n$ on lead 70 in auxiliary subtractor 69. The difference appears on bus 71 and is applied to other inputs of multipliers 68, where correlation with the previous digits from leads 72 occurs. The outputs of multipliers 68, which may be simple inverting switches in the binary case, are averaged and integrated in low-pass filters 67. The integrated averages are used as control signals for establishing the coefficients of attenuators 63. Since the components of the receiving predictor in FIG. 5 are exact counterparts of those in the transmitting predictor of FIG. 4, the predicted digits $\hat{a}_n$ are substantially the same in both transmitter and receiver. Therefore, there is no transmission loss in the adaptive prediction system. Should prediction errors occur in the receiver prediction due to channel noise, their effect would tend to be cumulative. However, such error propagation under normal circumstances has been found to cause little change in the overall error rate.

Figure 6A:
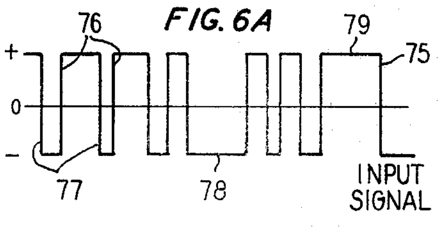
FIGS. 6A and 6B are waveform diagrams illustrating the operation of an adaptive signal predictor according to this invention.
Figure 6B:
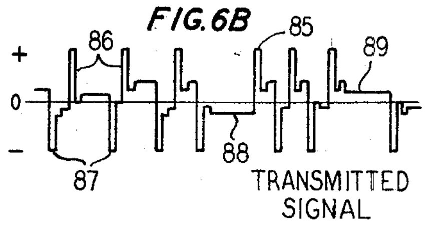

A typical binary data sequence is shown in waveform 75 of FIG. 6A and the approximately corresponding error sequence 85 actually transmitted in a three-tap predictive system according to this invention is shown in FIG. 6B. It is readily apparent that the average power in transmitted waveform 85 is much below that of original waveform 75. Because of the redundancy in the input data sequence (as appears, for example, in all-zero 78 and all-one 79 sequences), transmitted waveform 85 has relatively long periods 88 and 89 of near-zero voltage. At abrupt transitions, such as positive transitions 76 and negative transitions 77 in waveform 75, the predictor is "surprised" and peak errors 86 and 87 occur in waveform 85.

In quiescent portions 78 and 79 of waveform 75, transmitted waveform 85 does not dwell at absolute zero, however, because the attenuators have adjusted themselves to the average statistics of the signal and the time constants of smoothing filters have prevented adjustments in such short time spans. The correlation between adjacent bits in waveform 75 can be shown to be about 80 percent, that is, there is an 80 percent chance that each succeeding digit will be of the same polarity as its predecessor. Thus, the predictors keep predicting a succeeding digit with approximately 80 percent of the amplitude of the prior digit. The resultant error signal tends therefore to be 20 percent of the peak amplitude. If the all-zero or all-one sequence should persist beyond the time constant of the smoothing filters, the attenuator coefficients would gradually change and make better predictions. The above explanation is, of course, oversimplified because the correlation between the present digit and prior digits two and three intervals removed is also involved when using a three-tap predictor, and these correlations would need to be taken into account for a precise analysis of the operation of the predictor.

Redundancy removal in digital data transmission systems, as made possible by this invention, has two important applications. The average transmitted power requirements of a data transmission system are lowered without appreciably affecting the data error rate. In fact, the probability of error may be reduced by amplifying the error signal to maintain the transmitted power level constant. This amplification takes place automatically if predicted signals are transmitted over compandored transmission facilities, such as are employed in toll telephone transmission. In this case, an actual improvement in signal-to-noise ratio is obtained. This is entirely unexpected, since the normal purpose of compandoring is to limit the dynamic range of transmitted speech and not to improve the signal-to-noise ratio.

Periodic transmission patterns (all-one, all-zero and dotting patterns are examples), normally give rise to tones, that is, line spectra, in the transmission channel which cause overloading and other system malfunctions. With the predictive system, as the input data becomes entirely redundant, the transmitted power tends to zero level. A one-tap predictor suffices to eliminate all-one, all-zero and even dotting tone patterns. A two-tap predictor eliminates three-element patterns. In general an $n$-tap predictor will eliminate all repetitive patterns of period equal to or less than $n+1$. The need for more complex scramblers and descramblers as has been suggested for wideband data transmission systems is obviated.

While the adaptive predictor of this invention has been described in terms of its application to the removal of redundancy in binary digital data transmission systems, it will be apparent to those skilled in the art that its principles are as well applicable to the removal of redundancy in multilevel digital data transmission systems and to analog systems. The scope of this invention is to be measured by the appended claims.

What is claimed is:

1. The combination with a predicted wave transmission system including means deriving one or more delayed samples of a message wave to be transmitted, means attenuating such samples by variable factors, means combining such attenuated samples to form a predicted value, and means forming an error signal for transmission as the difference between the instant actual sample value and such predicted value of means adaptively varying said attenaution factors comprising means correlating said delayed samples with said error signal to generate control signals, and means responsive to said control signals altering said attenuation factors in a direction to minimize said error signal.

2. The combination according to claim 1 in which said correlating means comprises means multiplying each of said delayed message wave samples by said error signal, and means integrating the products appearing in the outputs of said multiplying means over a period exceeding the sampling interval for said message wave.

3. The combination according to claim 2 in which said message wave is synchronous binary digital data and said multiplying means are inverting switches.

4. The combination as set forth in claim 1 in further combination with a transmission channel for said error signals and a receiver at the far end of said channel for utilizing said error signals to reconstruct said message wave.

5. The combination of claim 4 in which said receiver comprises means adding the error signals augmented by noise received over said transmission channel to predicted values derived from a summation of selectively attenuated reconstructed previous message wave digits, means slicing the output of said adding means to form normalized reconstructed message wave digits, means subtracting said predicted values from said reconstructed digits in the output of said slicing means to form a prediction error signal, means storing one or more previous reconstructed digits, adjustable attenuating means for each of said stored previous reconstructed digits, the summation of the outputs of said attenuating means constituting said predicted values, means correlating said prediction error signal from said subtracting means with each of the previous reconstructed digits in said storing means to form control signals, and means applying said control signals to said attenuating means to optimize said predicted values.

6. A predicted wave transmission system comprising in combination a transmitter, a transmission channel, and a receiver:

said transmitter comprising a data message source, means deriving one or more samples from said message source delayed from each other by a uniform sampling interval, first means selectively attenuating each of said delayed samples, first means summing said attenuated samples to form a first predicted signal value, means subtracting said first predicted signal value from the present actual signal value emitted by said message source to form an error signal for transmission over said channel, first means correlating said error signal with said delayed message samples to generate first control signals, first means integrating said first control signals over a period of time exceeding said sampling interval, and means applying said integrated control signals to adjust said attenuating means to minimize said error signal; and said receiver comprising adding means for a received error signal and a second predicted signal value, threshold slicing means coupled to said adding means reconstructing data message signals, a message sink for reconstructed data signals, means delaying one or more reconstructed data signals by said uniform sampling interval, second means selectively attenuating each of said delayed reconstructed signals, second means summing said attenuated signals to form said second predicted signal value for application to said adding means, means taking the difference between said second predicted signal value and said reconstructed signal, second means correlating the difference from said taking means with the signals in said delaying means to generate second control signals, second means integrating said second control signals over said period of time exceeding said sampling interval, and means applying said integrated second control signals to adjust said second attenuating means to optimize said second predicted value with respect to said first predicted value at said transmitter.

7. The predicted wave transmission system according to claim 6 in which said message data source emits binary signals, said deriving means and said delaying means are shift registers, said first and second attenuating means are inverting switches actuated in accordance with the polarity of the outputs of said respective first and second integrating means, and said first and second correlating means are also inverting switches.

8. A receiver for an adaptive predicted wave transmission system in which the receiver signal contains an error component derived from the difference between each present message digit and a value predicted from selectively attenuated prior digits and a noise component added in a noisy transmission channel comprising means combining said received signal with a predicted value, slicing means operating on the output of said combining means to separate said noise and error components, the output of said slicing means constituting reconstructed message digits, means subtracting said predicted value from said reconstructed message digit to recover said error component, means delaying said reconstructed digits to make available one or more prior reconstructed digits, means selectively attenuating said prior reconstructed digits, the summation of such attenuated prior digits forming said predicted value, means multiplying said prior reconstructed digits by said error components to form correlated values, and means integrating said correlated values over a period of time to form control signals for said attenuating means.

References Cited

UNITED STATES PATENTS

| | | | |
|---|---|---|---|
| 2,921,124 | 1/1960 | Graham. | |
| 3,414,845 | 12/1968 | Lucky | 325—41 |

ROBERT L. GRIFFIN, Primary Examiner

A. J. MAYER, Assistant Examiner

U.S. Cl. X.R.

325—41, 42, 44